(12) United States Patent
Aaker

(10) Patent No.: US 6,510,499 B1
(45) Date of Patent: Jan. 21, 2003

(54) METHOD, APPARATUS, AND ARTICLE OF MANUFACTURE FOR PROVIDING ACCESS TO DATA STORED IN COMPRESSED FILES

(75) Inventor: Kenneth Dale Aaker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 09/599,336

(22) Filed: Jun. 22, 2000

(51) Int. Cl.[7] .............................................. G06F 13/00
(52) U.S. Cl. ...................................... 711/154; 711/165
(58) Field of Search .................................. 711/154, 165

(56) References Cited

U.S. PATENT DOCUMENTS 5,465,337 A * 11/1995 Kong ........................ 711/206
6,314,530 B1 * 11/2001 Mann ........................... 714/25
6,334,213 B1 * 12/2001 Li ............................. 717/170

* cited by examiner

*Primary Examiner*—Reba I. Elmore
(74) *Attorney, Agent, or Firm*—Moser, Patterson & Sheridan, LLP; Gero G. McClellan

(57) ABSTRACT

A method, article of manufacture, and apparatus for ordering and retrieving pages of data in a computer operating system is provided. The invention provides for ordering pages of data in a computer operating system during execution of a program file according the order in which the pages are accessed. In one embodiment, a time-ordered access sequence of a plurality of uncompressed pages of data is traced. The plurality of uncompressed pages of data is then compressed into one or more blocks of compressed pages and correlated with the one or more blocks of compressed pages in a relocation directory. The one or more blocks of compressed pages can then be stored according to the time-ordered access sequence.

36 Claims, 6 Drawing Sheets

*Fig. 5*

| | KERNEL TRACE INFORMATION 502 | | | | RELOCATION DIRECTORY 144 | | |
|---|---|---|---|---|---|---|---|
| ACCESS RECORD 504 | OFFSET VALVE 506 | DATA SIZE 508 | NON-OPTIMIZED COMPRESSION BUFFER BLOCK 510 | | NON-OPTIMIZED PAGE NUMBER 512 | OPTIMIZED COMPRESSION BUFFER PAGE NUMBER 514 | OPTIMIZED BLOCK NUMBER 516 |
| 1 | 0 | 64 | 0 | | 0 | 0 | 0 |
| 2 | 0 | 4096 | 0 | | 0 | 0 | 0 |
| 3 | 126,976 | 4096 | 1 | | 30 | 1 | 0 |
| 4 | 131,072 | 4096 | 2 | | 31 | 2 | 0 |
| 5 | 122,880 | 4096 | 1 | | 29 | 3 | 0 |
| 6 | 106,492 | 4096 | 1 | | 25 | 4 | 0 |
| 7 | 110,592 | 4096 | 1 | | 26 | 5 | 0 |
| ... | ... | ... | ... | | ... | ... | ... |
| 16 | 94,208 | 4096 | 1 | | 23 | 15 | 0 |
| 17 | 28,672 | 4096 | 0 | | 6 | 0 | 1 |
| 18 | 98,304 | 4096 | 1 | | 23 | 1 | 1 |
| 19 | 151,552 | 4096 | 2 | | 37 | 2 | 1 |
| ... | ... | ... | ... | | ... | ... | ... |
| 31 | 159,744 | 4096 | 2 | | 39 | 15 | 1 |
| 32 | | | | | | 0 | 2 |
| 33 | | | | | | 1 | 2 |
| 34 | | | | | | 2 | 2 |
| ... | ... | | | | | ... | ... |

METHOD, APPARATUS, AND ARTICLE OF MANUFACTURE FOR PROVIDING ACCESS TO DATA STORED IN COMPRESSED FILES

BACKGROUND OF THE INVENTION

1. Field of the Invention

The invention relates to retrieving pages of data stored in computer memory. More particularly, the invention relates to a method, apparatus, and article of manufacture for organizing pages of compressed data in computer memory for subsequent program execution.

2. Background of the Related Art

Flash memory is an adaptation of an electrically erasable programmable read-only memory (EEPROM), which may be erased and reprogrammed in blocks instead of one byte at a time. Flash Memory cards have increased in popularity because of the ease in updating the programs resident in the cards. Most personal computers (PC's) have their basic input/output system (BIOS) stored in a flash memory module. Flash memory has also become popular in modems because it enables the modem manufacturer to support new protocols as they become standardized. Furthermore, some of the next generation workstations utilize flash memory to store programs such as an operating system and/or one or more application programs.

The cost of flash memory modules is directly related to the capacity of the modules. To reduce the capacity and associated costs of utilizing flash memory in a device, the files containing executable programs along with shared function libraries used by the executable programs may be compressed for example, via a compression buffer. The compression ratio increases as the amount of data in any compression "cluster" increases. For example, using a 64 KB cluster size yields approximately 60% compression such that a 1 MB file becomes a 400 KB file after compression.

Many memory management systems utilize a demand paging method to bring program instructions and data from virtual memory (e.g., flash memory) into Random Access Memory (RAM). Generally, demand paging is a type of swapping in which pages of data are copied from a storage source, such as a hard disk or flash memory, pages of data are copied from a storage source, such as a hard disk or flash memory, into the RAM as required. In particular, a computer system starts a program by retrieving the very first sections of the program from the file in the storage source, and then begins executing the program instructions in the retrieved sections. When an address of referenced data is not currently stored in the RAM, the processor generates a page fault, i.e., an interrupt. Upon triggering a page fault, a kernel page supervisor causes the missing page to be retrieved from the storage source. Once the page has been read into storage, the kernel page supervisor will allow the program to resume exactly where the program left off prior to the page fault.

In a memory management system utilizing demand paging, only the pages of the program that are actually needed to run the program are retrieved. Such memory management method generally reduces the amount of data transferred compared to some other types of memory management methods, which load all of the program instructions and data into storage before beginning program execution. As a result, demand paging substantially increases the operating efficiency of data processing systems and reduces the amount of high speed memory (e.g., RAM) needed to store instructions at any given time.

During further execution of the file, a problem arises when retrieving a required page located in the executable file when such file is compressed, because demand paging retrieves pages in a "random order". In particular, when the next page event occurs, it is unlikely that the page requested is available within the block of pages that were previously decompressed and now reside within the RAM. As the executable file is processed, the operating system will initiate a page fault to retrieve the page of the executable file that is missing in the RAM. For example, in a compressed block containing 16 pages of data, the missing page that is required for further execution is stored along with 15 other compressed pages in one of a plurality of compressed blocks on the flash memory device. If the next page is not currently in the compression buffer, the set of pages currently in the compression buffer must be discarded. Thereafter, another compressed block of 16 pages must be retrieved from the storage source, decompressed, and the requested page extracted. In a worst case scenario for a 1 MB executable file, all 16 compressed blocks of pages would have to be decompressed once in a non-sequential order to retrieve one page from each 16-page block. As such, 32 KB (1024×32) of compressed data would have to be retrieved 256 times (16 pages/block×16 block/file) resulting in 8,388,608 bytes (8 MB) of data being uncompressed.

Therefore, there is a need for a computer memory management system that efficiently utilizes demand paging on either decompressed or compressed data.

SUMMARY OF THE INVENTION

The present invention provides a method, article of manufacture, and apparatus for ordering a computer's memory management system that utilizes demand paging on either decompressed or compressed data. One aspect of the invention provides, a method of ordering pages of data in a computer operating system during execution of a program file comprising a plurality of uncompressed pages of data. The method comprises tracing an execution of the plurality of uncompressed pages of data in a time ordered sequence and compressing the plurality of uncompressed pages into one or more blocks of compressed pages. Each of the plurality of uncompressed pages is then correlated with the one or more blocks of compressed pages in a relocation directory. The one or more blocks of compressed pages are then stored according to the time ordered sequence. In one embodiment, the method is embodied in a program contained on a computer-readable medium and is executable by a processor.

Another aspect of the invention provides a method of retrieving pages using a relocation directory during a page fault, wherein the relocation directory contains an access profile indicating the temporal order in which the pages were accessed for execution. The method comprises reading an offset and size of a requested page and determining whether a file containing the requested page is a compressed file. If the requested page is not compressed, the requested page is retrieved for execution. If the requested page is compressed, the offset of the requested page is translated to a value of a compressed block as defined in the relocation directory. The compressed block is then decompressed. In one embodiment, the method is embodied in a program contained on a computer-readable medium and is executable by a processor.

Yet another aspect of the invention provides an apparatus comprising a processor, volatile memory, a permanent storage device, a compression buffer, and a data structure residing in the permanent storage device. The data structure contains correlated values representing a plurality of pages in a compressed format and in an uncompressed format. The values of the plurality of pages are ordered according to when each of the plurality of pages in the uncompressed format was initially accessed by the processor during execution of a program.

BRIEF DESCRIPTION OF THE DRAWINGS

The teachings of the present invention can be readily understood by considering the following detailed description in conjunction with the accompanying drawings, in which:

FIG. 5 depicts a diagram of a relocation directory data structure; and

To facilitate understanding, identical reference numerals have been used, where possible, to designate identical elements that are common to the figures.

DETAILED DESCRIPTION OF THE PREFERRED EMBODIMENT

The present invention relates to a method for managing compressed data in a computer system utilizing a demand page memory system. Specifically, the invention relates to a method for time ordering compressed data as sequentially utilized by a computer's operating system. Although described with reference to flash memory, it is understood that the present invention has application to any persistent storage device.

As described in detail herein, aspects of the preferred embodiment pertain to specific method steps implementable on computer systems. In an alternative embodiment, the invention may be implemented as a computer program-product for use with a computer system. The programs of the program-product define the functions of the preferred embodiment and may be delivered to a computer via a variety of signal-bearing media, which include, but are not limited to, (a) information permanently stored on non-writable storage media (e.g., read-only memory devices within a computer such as CD-ROM disks readable by CD-ROM drive); (b) alterable information stored on writable storage media (e.g., floppy disks within diskette drive or hard-disk drive 114); or (c) information conveyed to a computer by a communications medium, such as through a computer or telephone network, including wireless communications. Such signal-bearing media, when carrying computer-readable instructions that direct the functions of the present invention, represent alternative embodiments of the present invention.

Figure 1:
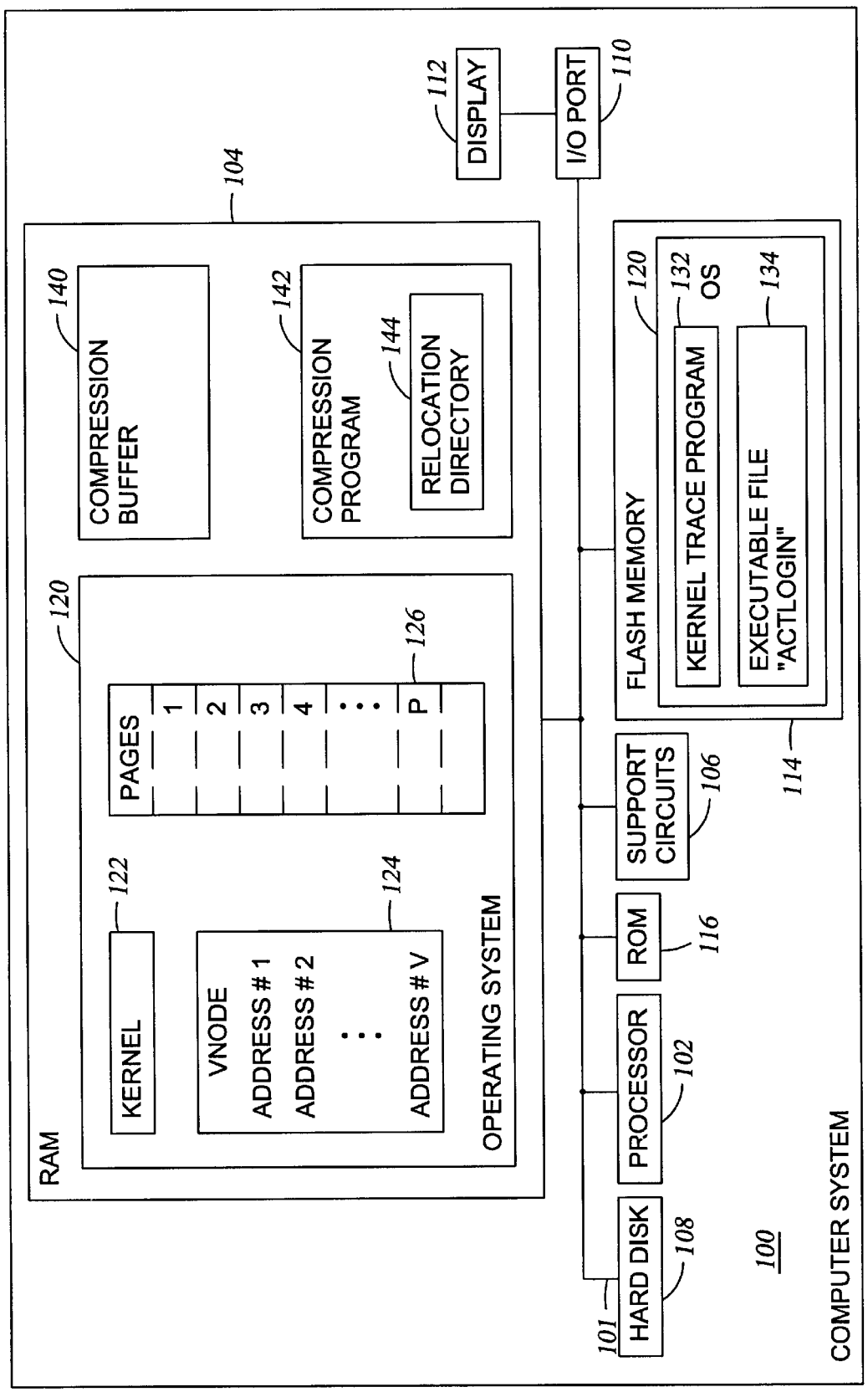
FIG. 1 depicts a block diagram of a computer system in accordance with the present invention.

FIG. 1 depicts a computer system 100 in accordance with the present invention. In one embodiment, the computer system 100 may be a desktop computer, however a person skilled in the art will recognize that a laptop computer, server, or the like, may alternately be utilized. The computer 100 comprises at least one system bus 101 to which various components are coupled and communicate with each other. Specifically, a microprocessor 102, hard disk 108, memory (RAM) 104, an I/O port 110, display 112, flash memory 114, read only memory (ROM) 116, and other support circuits 106 are coupled to the system bus 101. The microprocessor 102 receives information from and transmits information to each of the computer components coupled to the system bus 101. In addition, the microprocessor 102 performs system operations based upon the requirements of the computer system's software operating system 120 (shown residing in RAM 104) and application programs (not shown) that are installed thereon. Illustratively, the microprocessor 102 may be an INTEL PENTIUM® type processor or the like. The ROM 116 typically includes a Basic Input-Output System (BIOS) program that controls basic hardware operations such as the interaction of the microprocessor 102 with a keyboard/mouse (not shown), hard disk 108, video display 112, and the like.

The RAM 104 is volatile memory that is capable of storing the necessary data and program structures for processing by the processor 102. The RAM 104 receives the operating system (OS) 120 and applications software as required, from a permanent storage medium such as a hard disk 108, CD-ROM player (not shown) and the flash memory 114 via the processor 102.

In FIG. 1, the operating system 120 is illustratively depicted as concurrently being stored in the RAM 104 and in the flash memory device 114, so as to represent that the operating system 120 and memory management system is actively running. The operating system (OS) 120 may be IBM's OS/2 WARP 4.0® system. The operating system 120 is capable of interfacing with all of the hardware components of the computer 100. In contrast, an applications program is an end-user program designed to perform specific tasks such as spreadsheets, word processing, web browsing, and the like.

The flash memory 114 may be any electrically erasable programmable read-only memory (EEPROM) that may be erased and reprogrammed in blocks instead of one byte at a time. In one embodiment, the program files 115 stored in the flash memory 114 are in a compressed format however, the files may also be stored in a decompressed format. The I/O port 110 includes various controllers (not shown) for input devices such as the keyboard and mouse, and output devices such as an Ethernet network adapter or infrared device (not shown). The other support circuits 106 may generally include controllers for the hard disk 108, floppy drive, graphics display, and the like (not shown).

In general, for computer systems utilizing on-demand memory management, the executable and library files of a program that are stored on the flash memory 114 are transferred to the RAM 104 for execution by the processor 102 under control of the operating system 120 as needed. The on-demand method of memory management is commonly known as a paging system. A page is a fixed amount of data that is sent to the RAM 104 for execution. Illustratively, each page is 4096 bytes (4 KB) in size, although other page sizes may be utilized within the embodiments of the invention.

When the program needs a page that is not in RAM 104, a page fault occurs. A page fault is an interrupt signal informing a program that an event has occurred. When a program receives an interrupt signal, the program takes specified action to rectify that event. For example, the operating system 120 may copy the required page into RAM 104 from virtual memory, e.g., the hard disk 108 or flash memory 114. Where available memory constraints exist in the RAM 104, the operating system 120 may copy pages back to the hard disk 108 or flash memory 114 as required. The RAM 104 may simultaneously store a plurality of pages $126_1$ to $126_p$ (collectively pages 126) of data to accommodate various files being executed by the program that is running.

Additionally, a kernel 122 is stored in the RAM 104. The kernel 122 is a central module of the operating system 120 that is initially loaded into the RAM 104. The kernel 122 remains in the RAM 104 and is responsible for memory management, process and task management, and disk management. The kernel 122 manages one or more files that are open during the course of operation. Generally in any instance of time, there are a plurality of opened files, each having unwritten data stored in various buffers in the RAM 104 that have not been delivered to a specific device, as well as data stored in buffers of a particular device that is waiting for execution. To track status of the opened files, internal operating system data structures called a v-nodes 124 are utilized. Accordingly, there is one v-node for each open file. Each v-node 124 comprises a unique name (e.g., hexadecimal address), and provides identifying information and status regarding the open file that the v-node is tracking.

The RAM 104 further comprises a compression buffer 140 and a compression program 142. In one embodiment of the invention, the compression buffer 140 is capable of storing 64 KB of data and the compression program 142 performs a ½ data compression on the 64 KB (65536 bytes) of data stored in the compression buffer 140. As such, 16 pages of data (i.e., 64 KB data in the compression buffer /4 KB data per page) may be stored in the compression buffer 140 at a time. Accordingly, when the compression buffer 140 is full, 64 KB of data is compressed into 32 KB of data (i.e., one half of the uncompressed value). A person skilled in the art will recognize that a compression buffer 140 having other storage capacities, as well as other compression rates, may be utilized. Compression algorithms utilized by the compression program 142 may illustratively include the Lempel-Zif-Welch (LZW) data compression technique, run length encoded technique, and the like.

Figure 2:
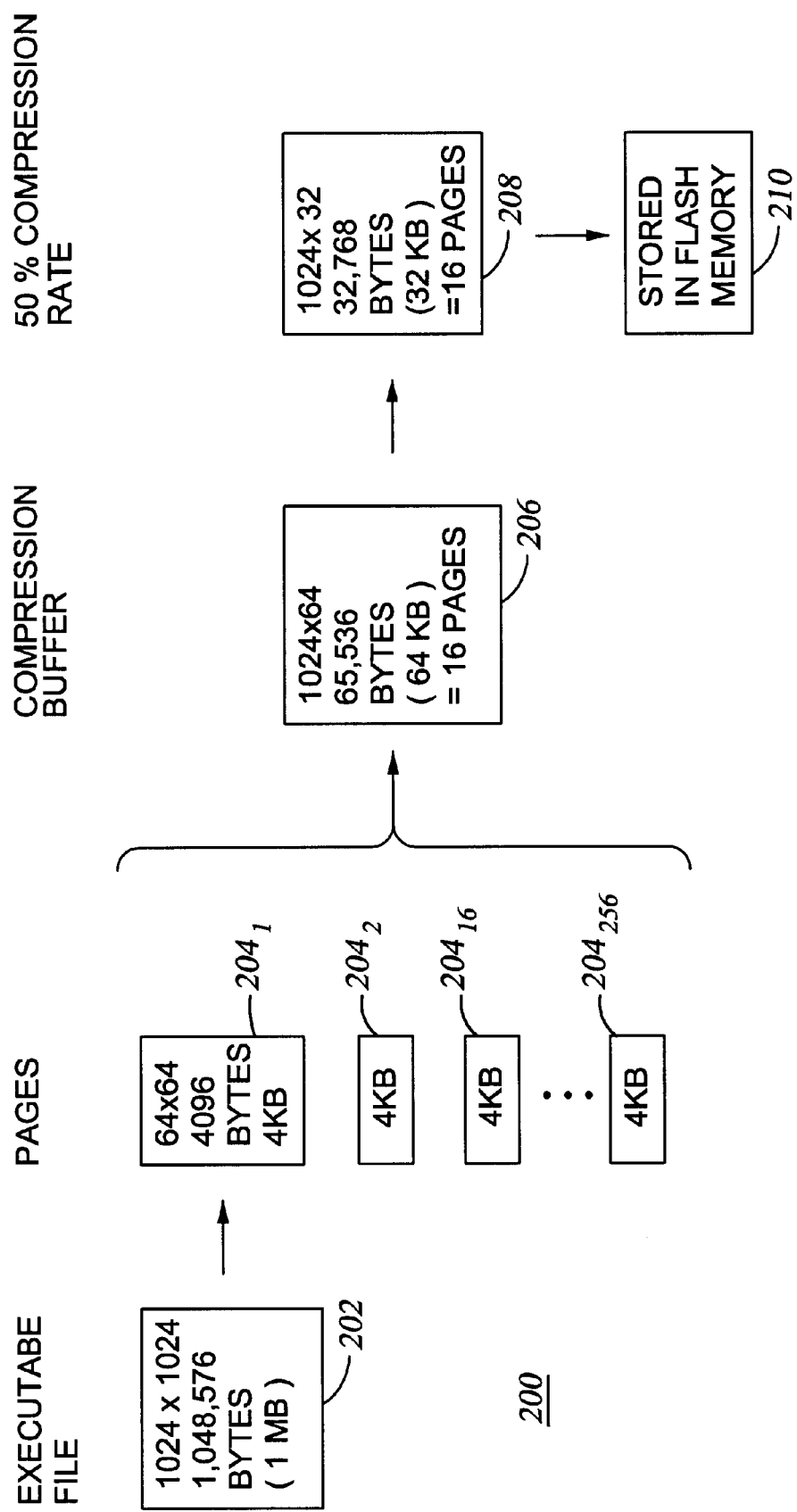
FIG. 2 depicts a flow diagram for compressing pages of an executable file of the present invention.

FIG. 2 depicts a flow diagram 200 for compressing pages 126 of an executable file of the present invention. Typically, an operating system 120 is comprised of thousands of files 200. An executable file 202 illustratively having a size of 1 MB may be divided into 256 pages $204_1$ through $204_{256}$ (1,048,576 bytes/4096 bytes/page). In one embodiment of the invention, the compression buffer 140 is physically able to store 64 KB of information 206 at a time. As such, 16 pages (64 KB/ 4 KB) of the executable file 202 may be stored in the compression buffer 140 in a single instance. Once the compression buffer 140 is filled, the 16 pages of file information is compressed into a compressed block of data 208 and then stored in the permanent storage device 210 such as the flash memory. Illustratively, the compression buffer 140 performs at about a 50% compression rate. Thus, the 64 KB file is compressed to a size of 32 KB. A person skilled in the art will recognize that other compression rates, as well as various techniques, may be utilized to compress data. The compressed block 208 (32 KB at 50% compression rate) is then stored on the flash memory device 114. The foregoing compression steps are repeated for the remaining data contained in the 1 MB executable file 202. Therefore, for a 1 MB executable file, 16 blocks each comprising 16 pages of data are stored as a compressed file on the flash memory device 114.

Once the executable file 134 is compressed, the compressed data is then reorganized into a time-ordered set of data elements. In one embodiment, tracing the order in which the data is accessed during processing facilitates the reorganization. Referring to FIG. 1, a kernel trace program 132, stored on the flash memory device 114, runs in conjunction with the operating system 120 and intercepts and analyses the data from an executable file 134. Specifically, the kernel trace program 132 intercepts every interaction between a specific executable file 134 such as the "ACTLOGIN" File and the system kernel 122. The kernel trace program 132 then generates an access pattern profile for the specific executable file 134 that the kernel trace program 132 just analyzed. The access pattern profile reflects the sequence in which the pages of the opened executable file 134 are processed. Illustratively, the access pattern profile comprises a listing of the offset locations and the corresponding amount of bytes sequentially executed by the open executable file 134. In other words, the access pattern profile is a listing of each group of bytes, i.e., pages, in the order that the pages of the open file are executed by the operating system 120.

Figure 3:
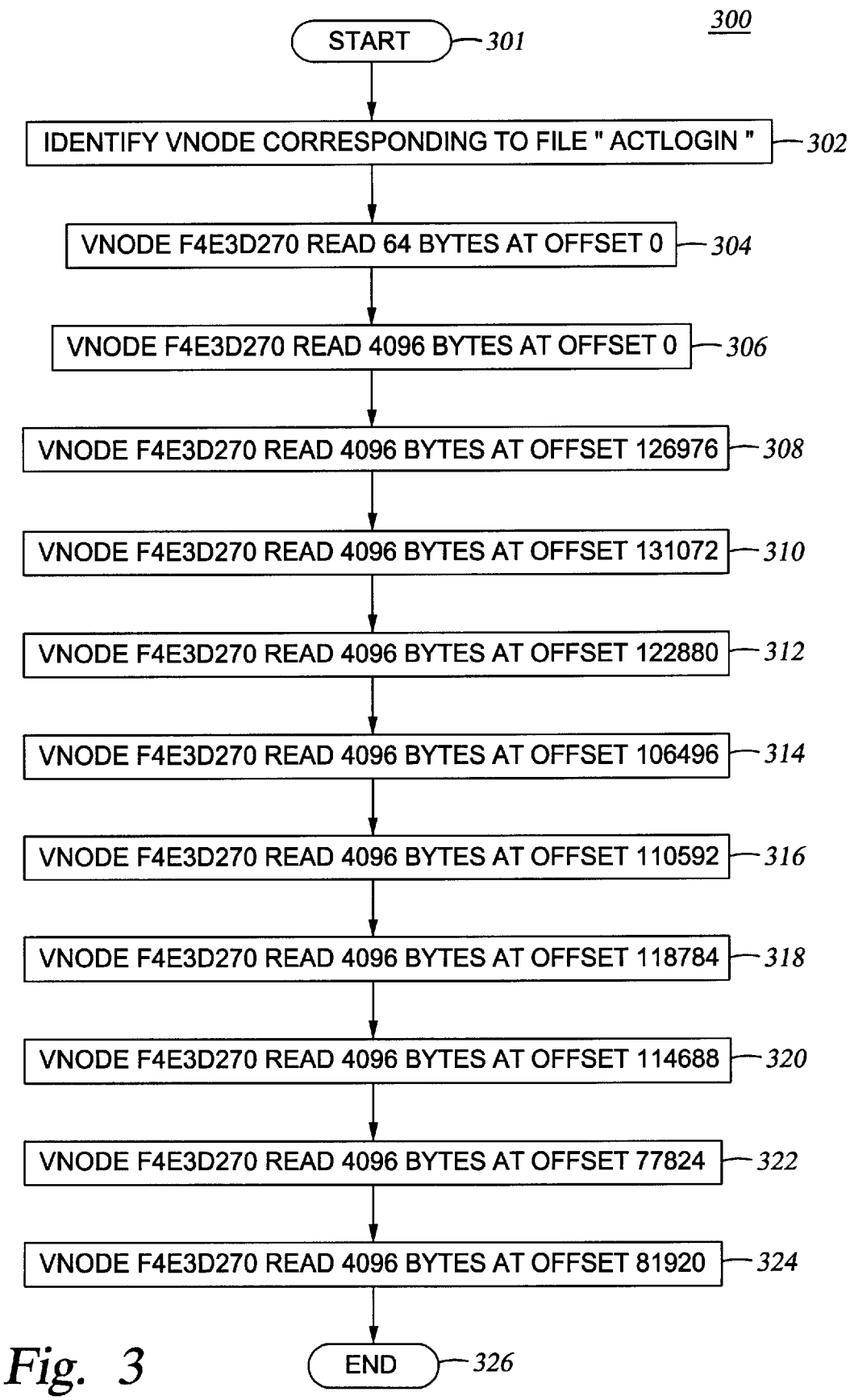
FIG. 3 depicts a flowchart of tracing an illustrative access pattern profile for an executable program.

FIG. 3 depicts an illustrative access pattern profiling method 300 of tracing a file as the file is executed using the kernel trace program 132. Illustratively, the file being executed by the operating system 120 is an executable file 134 named "ACTLOGIN" (shown in FIG. 1). The method 300 begins at step 301, and proceeds to step 302 where the v-node 124 corresponding to the file ACTLOGIN file 134 is identified as the opened file that is to be traced during execution. In this instance, the v-node 124 corresponding to the open executable file ACTLOGIN 134 is uniquely identified according to a hexadecimal address F4E3D270. In steps 304 through 324, the kernel trace program 132 generates an access pattern profile by tracing the execution of the ACTLOGIN file 134. Moreover, the access pattern profile represents a unique set of an access records, which in turn define a sequence of events during the executable file execution. Each access record comprises an offset value and size of data that is traced during the execution of the ACTLOGIN file 134.

Specifically, in step 304, the operating system 120 requires 64 bytes at offset 0 from the base address. The offset refers to a value added to a base address to produce a second address at which the data of interest begins. The base address is an address that serves as a reference point for other addresses. In this instance, the base address at offset 0 for the ACTLOGIN file 134 is the beginning of the file. Thus, the first access record traced by the kernel trace program 132 depicts the first 64 bytes of the file 134. It should be noted that while only 64 bytes are needed by the operating system 120 for processing at step 304, the computer system's 100 demand paging memory management system operates using a 4 KB page size. Thus, a 4 KB page is retrieved at step 304 but only 64 bytes are used by the operating system 120.

In step 306, the operating system 120 requires a second block (of 4 KB in size) of the executable file ACTLOGIN 134 for processing. The kernel trace program 132 reads 4096 bytes, (4 KB) at offset 0 and records the offset and size values as the second access record. As depicted, the 4 KB length of data that is read by the kernel trace program 132 is consistent with the typical 4 KB page size that is used by the computer system's 100 demand paging memory management system. Because the base address and offset are the same as those used to access the first record in step 304, the kernel trace program 132 reads the same 4 KB of data that were retrieved in step 304. In steps 308 and 310, the kernel trace program 132 traces the third and fourth access records respectively. In each instance, 4 KB are read at offset 126976 and 131072, respectively. Thus, the third and fourth access records 308 and 310 are sequential pages of data read from the ACTLOGIN file 134.

In step 312, another 4 KB is read by the kernel trace program 132 at offset 122880. In step 414, another 4 KB is read at offset 106496. Likewise, for steps 316 through 324, 4 KB of data are sequentially read during each step. The corresponding offset values identified by the kernel trace program 132 are 110592, 118784, 114688, 77824, and 81920, which are sequentially listed as access records 7 through 11, respectively. Once each offset and byte size of the executable file 134 have been traced by the kernel trace program 132, the entire access pattern profile generated by the method 300 is stored in a temporary file (not shown) in the RAM 104 for subsequent conversion and inclusion in a relocation directory 144. The relocation directory 14 is located in the compression buffer 140. In step 326, the access pattern profiling method 300 ends. Thus, the memory management system executes pages in a non-sequential order from which the pages were initially stored. Accordingly, the access pattern profiling method 300 serves as a sequential listing of the pages as they are executed, as represented by each page's respective offset value.

FIG. 5 depicts a diagram of a data structure 143 which is created using the access record information gathered in the method 300 described above. A right side of the data structure 143 is a relocation directory 144. A left side of the data structure 143 contains the kernel trace information 502 regarding each access record 504. Specifically, an offset value 506, data size 508, and a non-optimized compression buffer block location 510 are set forth for each access record 504. In particular, the first access record 504 for the file ACTLOGIN 134 has an offset of 0 and a size of 64 bytes. The first 64 bytes of data are located in the first page of the uncompressed ACTLOGIN file 134. The block value for the non-optimized compression buffer block 510 is computed by dividing 65,536 bytes (e.g., the compression buffer is 64 KB) into the offset value 506, and then truncating the fractional or decimal portion from the resulting integer. For instance, the offset value 506 of 122,880 bytes /65,536 bytes is 1.875. After truncation, the non-optimized compression buffer block 510 has a value of 1.

Figure 4:
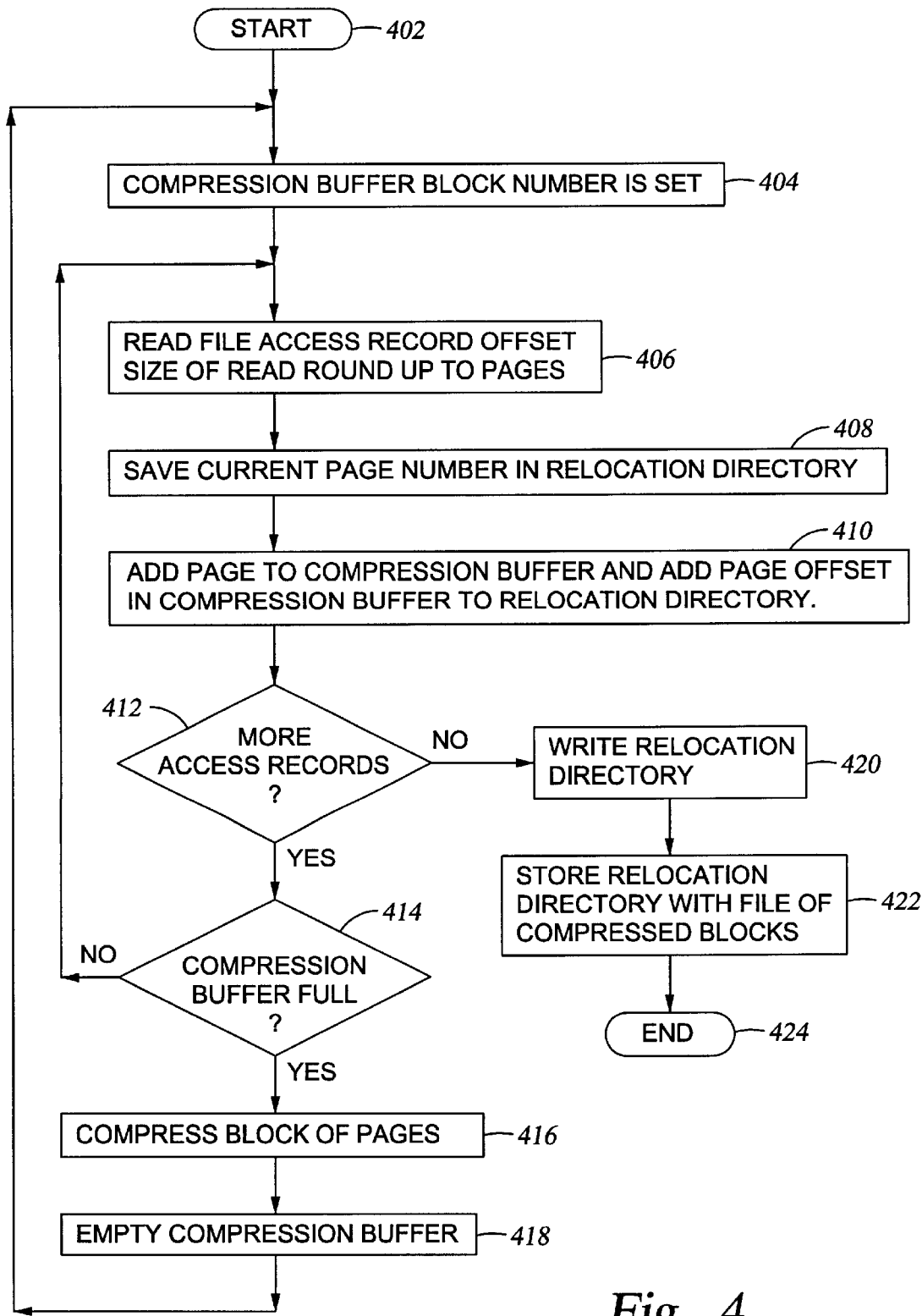
FIG. 4 depicts a flowchart of a method of creating a relocation directory.

FIG. 4 depicts a flowchart of a method 400 of creating the relocation directory 144 and will be described with reference to FIG. 5. The method 400 begins at step 402 and proceeds to step 404 where the block number for the compression buffer 140 is set. Since the compression program 142 is reading the first 64 KB of uncompressed data, the compression buffer's block number is set to the first block, block "0". In step 406, each file access record containing the offset and size, which was determined by the kernel trace program 132 (as described with reference to FIG. 3), is sent to the compression program 142. The compression program 142 then reads the first access record of the executable file.

In step 408, the page corresponding to the first access record, page 1, is saved in the uncompressed page number column 512 of the relocation directory 144. The compression program 142 counts pages beginning with the integer "0". Referring briefly to FIG. 5, the first page corresponding to the first access record 504 has a saved value of 0 in column 512 and has an optimized compression buffer page number "0" in column 514 in the relocation directory 144. Thus, the first page ("0") of the file ACTLOGIN 134 is saved as the first page ("0") in the first block to be compressed, i.e., compression block number "0"516 in the relocation directory 144.

The method 400 then proceeds to step 410. In step 410, the first page of data corresponding to the first access record 504 is loaded into the compression buffer 140. As discussed previously, a page is 4 KB in size. Therefore, even though only the first 64 bytes (see FIG. 3, $1^{ST}$ access record) of the file ACTLOGIN 134 was required by the operating system 120 for program execution, the entire 4 KB page is loaded. The corresponding compression buffer 140 block number, as set in step 404, is then added to the relocation directory 144 as depicted in column 516 of FIG. 5.

In step 412, the compression program 142 queries whether there are more access records 504 traced by the kernel trace program 132. If the query 412 is affirmatively answered, then the method 400 proceeds to step 414. In step 414, the compression program 142 queries whether the compression buffer 140 is full, i.e., contains 16 pages of data. If the query at step 414 is answered negatively, then the method 400 returns to step 406 where the next access record is read by the compression program 142.

Referring again to FIG. 5, the second access record has an offset value 506 of 0, a size 508 of 4096 bytes (4 KB), and the non-optimized compression buffer page number 510 is again page 0. Furthermore, in step 410 of FIG. 4, the uncompressed first page has already been loaded into the compression buffer 140 during the processing of the first access record 504. Accordingly, for the second access record 504 in step 410, the same first page ("0") of the file ACTLOGIN 134 is saved as the first page ("0") in the first block to be compressed, i.e., compression block number "0"516 in the relocation directory 144.

The method 400 then proceeds to steps 412 and 414 described above, and then returns to step 406 to processes the third access record. For the third access record (numeral 3 in column 504), the offset value 506 is 126,976, the page size 508 is 4 KB, and the page in the ACTLOGIN file 510 is the $31^{ST}$ page (126,976/4096). In the non-optimized format, the $31^{ST}$ page would be retrieved from a second loading of the compression buffer 140. Since the compression buffer 140 may hold up to 64 KB of uncompressed data, in a non-optimized format, the compression buffer 140 would have had to discard the first 16 pages and then load the second 16 pages of data to retrieve the $31^{ST}$ page at offset 126,976. However, during the optimization technique, in step 408, the third access record 504 is saved as page 30 (recall that counting begins with "0"), and the second compression buffer page 514 is saved as page 1 of the first compression block 516, block 0.

The steps described above are repeated until in step 414, the compression buffer 140 has stored 16 pages, i.e., 64 KB of data. If, in step 414, the compression buffer 140 is full, then the method 400 proceeds to step 416 where the 16 pages are compressed (illustratively, into 32 KB) and then stored on the flash memory device 114. Specifically, the compressed data is stored in the order that the access records 504 were read by the kernel trace program 134 and listed with the relocation directory 144. In step 418, the 16 pages of data are discarded from the compression buffer 140 to allow for storage of additional blocks of data. The method 400 proceeds to step 404 where the compression block number 516 is set to 1 for the next 16 access records 504. Accordingly, the compression block number 516 increases by one (1) for each subsequent set of 16 optimized pages.

The method 400 then proceeds through steps 406 to 410 as discussed above and continues in the same manner until, in step 412, there are no more access records 504. When all the access records 504 have been read and saved in the relocation directory 144, the method 400 proceeds to step 420. In step 420, the relocation directory 144 is saved as a data structure. In step 422, the relocation directory 144 is stored with the compressed blocks to form a compressed file in the flash memory device 114, and in step 424, the method 400 ends.

By optimizing the sequence of pages in an order that is most commonly retrieved by the operating system 120, each block of compressed data starting with the first block, block 0, is only read once for retrieval of the demanded pages. The optimization format works particularly well in the circumstances where the files are usually opened in the same sequence each time. Referring back to the example depicted in FIG. 3, each time instructions in a block of compressed data in the ACTLOGIN file 134 is executed, only 32 KB of compressed data must be retrieved and then be decompressed into 64 KB of data. Accordingly, if each page in the entire 1 MB ACTLOGIN file 134 were to be executed once, then only 512 KB (16 blocks×32 KB) of compressed data would have to be retrieved and decompressed to execute the instruction in the 1 MB file. By comparison, the non-optimized worst case scenario in the prior art results in 8 MB (256 KB×32 KB) of data, which has to be retrieved for execution. Thus, the optimization format enhances the processing speed and efficiency for running the operating system.

However, there are instances where the optimized sequence of demand paging is not in the same order as the optimized compressed file has been arranged. For instance, the operating system 120 may be performing some other function and require only a few pages of the optimized/compressed file (e.g., ACTLOGIN file) to satisfy the requirements of some other opened system file. In such circumstances where all the pages of the optimized blocks of data are not required, the embodiments described herein include techniques to retrieve such compressed pages from the compressed blocks stored on the flash memory device 114 without having to decompress all the blocks of the file.

Figure 6:
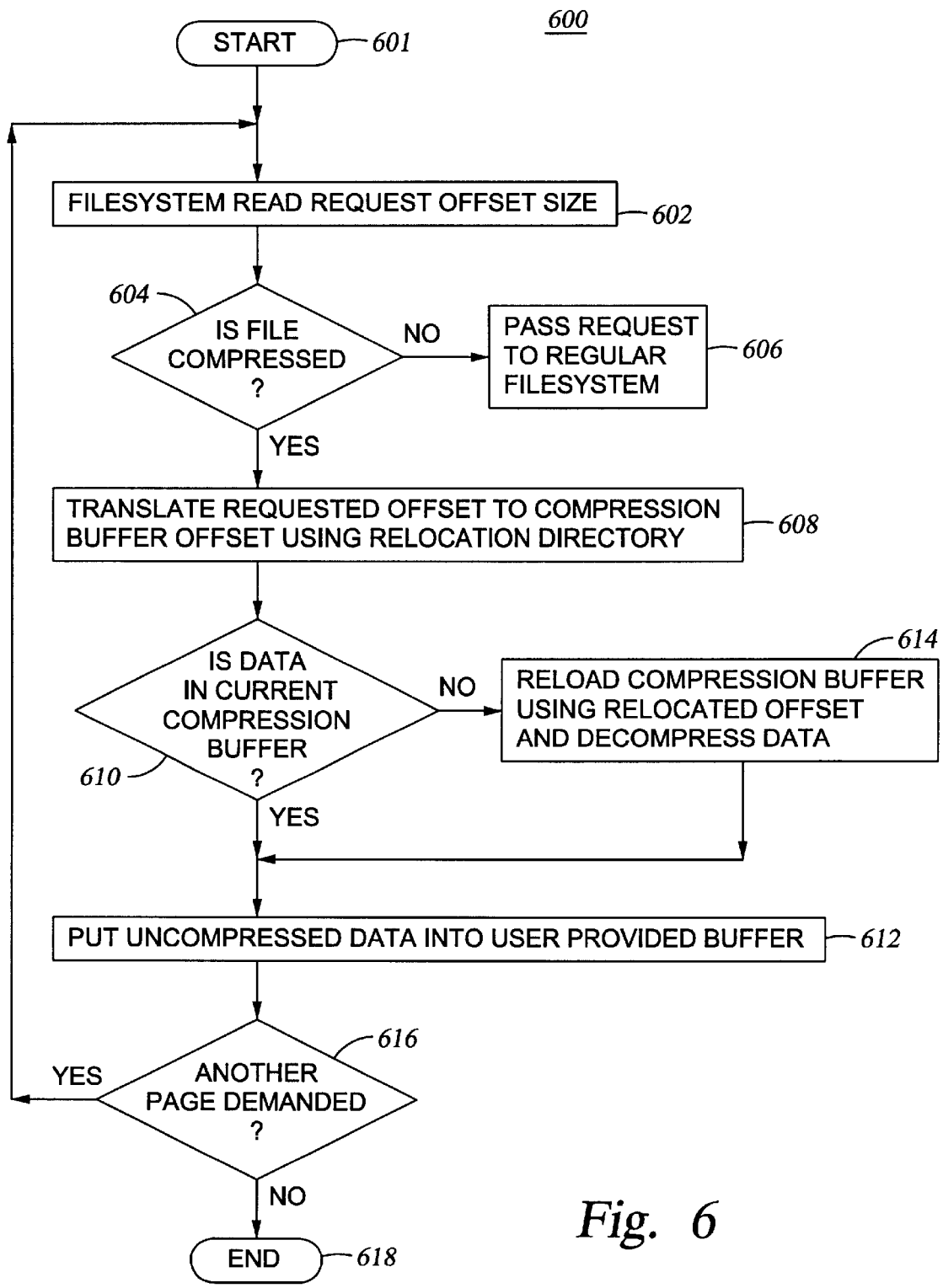
FIG. 6 depicts a flowchart of a method of decompression during file system access.

FIG. 6 depicts a flowchart of a method 600 of decompression during file system access. Specifically, the method 600 begins at step 601 where the operating system initiates a demand for a page of data. In step 602, the kernel trace program 132 reads the first offset value and data size for the requested file. In step 604, the method 600 queries whether the requested file is a compressed file. Each compressed file has a header that includes at least one bit that defines a file as a compressed file. If in step 604, the query is negatively answered, then in step 606, the pages demanded by the operating system are retrieved from the storage device and sent to the RAM as normally performed in a demand paging memory management system.

However, if in step 604 the query is affirmatively answered, then the method proceeds to step 608 where the page that is demanded in its uncompressed format is translated into the page number in the compressed format. For example, in FIG. 5, a demand for a page in the ACTLOGIN file having an offset value 506 of 106,492 and a size 508 of 4 KB is the $25^{TH}$ page in the uncompressed format. By utilizing the relocation directory 144, the $25^{TH}$ page correlates to an optimized compression buffer page number 514, which is the $4^{TH}$ page in the $1^{ST}$ compressed block 516 (block 0) of the compressed file 134. Once the compressed file has been identified and translated in the relocation directory 144, the method 600 proceeds to step 610. In step 610, the operating system 120 queries whether the requested page is currently in the compression buffer 140. If the query is affirmatively answered, then in step 612, the uncompressed page 4 is sent to the computer system's RAM 104 or a buffer in another device for processing.

However, if in step 610, the requested page is not in the compression buffer 140, then the method 600 proceeds to step 614. In step 614, the compression buffer 140 will discard any previous contents and then reloads with the compressed block of data that correlates with the requested page. Thereafter, in step 614, the reloaded data is decompressed. Following the previous example, the first block (block 0) is loaded into the compression buffer 140. The method 600 then proceeds to step 612 where the $4^{TH}$ page of the decompressed block of data is sent to the system RAM 104 or the device buffer for processing. The method 600 then proceeds to step 616 where a query is performed to determine if another page is demanded by the operating system 120. If in step 616, the query is affirmatively answered, then the method 600 repeats the steps 602 through 616. If, however, the query is negatively answered, then the method 600 ends in step 618.

The embodiments disclosed herein allows a memory management system of a computer system 100 to optimize demand paging in a time ordered manner. Furthermore, the pages that are optimized may be compressed in retrievable blocks of data without having to decompress all the compressed blocks within a file. As such, the computer system's processing efficiency is increased. Additionally, a data structure is generated in the form of a relocation directory. The relocation directory allows for translation between pages in a decompressed/non-optimized format and a compressed/optimized format. Therefore, the memory management system may retrieve and execute both decompressed and compressed pages of data. Thus, a method of organizing repeatable as well as random accessed compressed and decompressed data is presented.

Although several preferred embodiments that incorporate the teachings of the present invention have been shown and described in detail, those skilled in the art can readily devise many other varied embodiments that still incorporate these teachings.

What is claimed is:

1. A method of ordering pages of data in a computer operating system during execution of a program file comprising a plurality of uncompressed pages of data, the method comprising:

tracing a time-ordered access sequence of the plurality of uncompressed pages of data from a storage device;

compressing the plurality of uncompressed pages into one or more blocks of compressed pages;

correlating the plurality of uncompressed pages with the one or more blocks of compressed pages in a relocation directory; and storing the one or more blocks of compressed pages according to the time ordered access sequence.

2. The method of claim 1, wherein the storage device is a flash memory and wherein the step of storing comprises storing the one or more blocks of compressed pages in the flash memory.

3. The method of claim 1, wherein the tracing step comprises identifying a sequence in which pages of data are processed.

4. The method of claim 1, wherein a kernel tracing program performs the tracing step.

5. The method of claim 1, wherein the tracing step further comprises reading each page size and offset value from a base address from a file containing the plurality of uncompressed pages of data.

6. The method of claim 5, wherein each page has a size of 4 KB, the compressing step occurs after 16 pages of data are loaded into a compression buffer wherein each block comprises 16 pages of compressed data.

7. The method of claim 1, wherein the correlating step comprises storing a page value for each of the plurality of uncompressed pages with a corresponding block value of the compressed data.

8. The method of claim 7, further comprising storing the relocation directory with the compressed file.

9. A method of retrieving pages using a relocation directory during a page fault, wherein the relocation directory contains an access profile indicating the temporal order in which the pages were accessed for execution, the method comprising:

reading an offset and size of a requested page;
determining whether a file containing the requested page is a compressed file;
if the requested page is not compressed, retrieving the requested page for execution;
if the requested page is compressed, translating the offset of the requested page to a value of a compressed block as defined in the relocation directory; and
decompressing the compressed block containing the requested page.

10. The method of claim 9, further comprising prior to the decompressing step, determining if the requested page is currently stored in a compression buffer.

11. The method of claim 10, further comprising reloading the compression buffer with the compressed block containing the requested page.

12. The method of claim 11, further comprising sending the requested page to memory for execution.

13. A computer-readable medium having instructions or programs which, when executed by a processor, causes the processor to perform a method of ordering pages of data in a computer operating system during execution of a program file comprising a plurality of uncompressed pages of data, the method comprising:

tracing a time-ordered access sequence of the plurality of uncompressed pages of data from a storage device;
compressing the plurality of uncompressed pages into one or more blocks of compressed pages;
correlating the plurality of uncompressed pages with the one or more blocks of compressed pages in a relocation directory; and
storing the one or more blocks of compressed pages according to the time ordered access sequence.

14. The computer-readable medium of claim 13, wherein the one or more compressed pages are stored in flash memory.

15. The computer-readable medium of claim 13, wherein the tracing step comprises identifying a sequence in which pages of data are processed.

16. The computer-readable medium of claim 13, wherein a kernel tracing program performs the tracing step.

17. The computer-readable medium of claim 13, wherein the tracing step further comprises reading each page size and offset value from a base address from a file containing a the plurality of uncompressed pages of data.

18. The computer-readable medium of claim 17, wherein each page has a size of 4 KB, the compressing step occurs after 16 pages of data are loaded into a compression buffer wherein each block comprises 16 pages of compressed data.

19. The computer-readable medium of claim 13, wherein the correlating step comprises storing a page value for each of the plurality of uncompressed pages with a corresponding block value of the compressed data.

20. The computer-readable medium of claim 19, further comprising storing the relocation directory with the compressed file.

21. A computer-readable medium having instructions or programs which, when executed by a processor causes the processor to perform method of retrieving pages using a relocation directory during a page fault, wherein the relocation directory contains an access profile indicating the temporal order in which the pages were accessed for execution, the method comprising:

reading an offset and size of a requested page;
determining whether a file containing the requested page is a compressed file;
if the requested page is not compressed, retrieving the requested page for execution;
if the requested page is compressed, translating the offset of the requested page to a value of a compressed block as defined in the relocation directory; and
decompressing the compressed block containing the requested page.

22. The computer-readable medium of claim 21, further comprising prior to the decompressing step, determining if the requested page is currently stored in a compression buffer.

23. The computer-readable medium of claim 22, further comprising reloading the compression buffer with the compressed block containing the requested page.

24. The computer-readable medium of claim 23, further comprising sending the requested page to memory for execution.

25. An apparatus for ordering pages of data in a computer, comprising:

a processor;
volatile memory;
a permanent storage device;
a compression buffer; and
a data structure residing in the permanent storage device, the data structure having correlated values representing a plurality of pages in a compressed format and in an uncompressed format, wherein the values of the plurality of pages are ordered according to when each of the plurality of pages in the uncompressed format was initially accessed by the processor during execution of a program.

26. The apparatus of claim 25, wherein the volatile memory is random access memory (RAM).

27. The apparatus of claim 26, wherein the permanent storage device is flash memory.

28. The apparatus of claim 27, wherein the data structure is a relocation directory and wherein the correlated values comprise a plurality of page numbers for each page in an uncompressed format and a corresponding page number and associated block numbers for each page in a compressed format.

29. The apparatus of claim 25, wherein the compression buffer resides in the volatile memory.

30. The apparatus of claim 25, wherein the processor is configured to execute a kernel trace program adapted to trace the page values of the pages in their respective compressed and uncompressed formats.

31. The apparatus of claim 30, further comprising a kernel is stored in the volatile memory and wherein the kernel trace program traces a file being executed as the executed file interacts with the kernel.

32. The apparatus of claim 31, wherein the kernel trace program generates a trace file having a plurality of access records, each of the plurality of access records having an offset value and a page size value.

33. The apparatus of claim 32, wherein the compression buffer holds a block of sixteen pages of data.

34. The apparatus of claim 33, further comprising a compression program residing in the RAM to read the offset and page size values and stores them as page values in the relocation directory.

35. The apparatus of claim 34, wherein the relocation directory further comprises at least one block value corresponding to each compressed block value of a compressed file.

36. The apparatus of claim 35, wherein the compressed file is stored in the permanent storage devices.

* * * * *